United States Patent
Couch et al.

(10) Patent No.: US 7,118,036 B1
(45) Date of Patent: Oct. 10, 2006

(54) MOBILE INVENTORY MANAGEMENT SYSTEM

(75) Inventors: Alan B. Couch, Braselton, GA (US); Nathaniel Christopher Herwig, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 266 days.

(21) Appl. No.: 10/873,920

(22) Filed: Jun. 22, 2004

(51) Int. Cl.
 G06F 19/00 (2006.01)
 G06Q 30/00 (2006.01)
 G06Q 90/00 (2006.01)

(52) U.S. Cl. .................. 235/385; 235/383; 705/22; 705/28

(58) Field of Classification Search ............ 235/385, 235/383; 705/22, 23
See application file for complete search history.

(56) References Cited

U.S. PATENT DOCUMENTS

| | | | | |
|---|---|---|---|---|
| 4,673,932 A * | 6/1987 | Ekchian et al. | ......... | 340/10.32 |
| 5,426,423 A * | 6/1995 | Raimbault et al. | ........ | 340/5.91 |
| 5,654,508 A * | 8/1997 | Gibbs | .......... | 73/599 |
| 5,821,513 A * | 10/1998 | O'Hagan et al. | ........... | 235/383 |
| 6,032,127 A * | 2/2000 | Schkolnick et al. | ......... | 705/23 |
| 6,496,806 B1 * | 12/2002 | Horwitz et al. | ............... | 705/28 |
| 6,598,025 B1 | 7/2003 | Hamilton et al. | ............. | 705/22 |
| 6,659,344 B1 * | 12/2003 | Otto et al. | ................... | 235/381 |
| 6,736,316 B1 * | 5/2004 | Neumark | ..................... | 235/383 |
| 6,870,464 B1 * | 3/2005 | Okamura | .................. | 340/10.51 |
| 6,927,692 B1 * | 8/2005 | Petrinovic | ................ | 340/572.1 |
| 6,967,577 B1 * | 11/2005 | Taylor et al. | ............ | 340/572.1 |
| 7,038,573 B1 * | 5/2006 | Bann | ........................ | 235/385 |
| 7,044,373 B1 * | 5/2006 | Garber et al. | ............... | 235/385 |
| 2002/0170961 A1 * | 11/2002 | Dickson et al. | ............. | 235/383 |
| 2003/0015585 A1 * | 1/2003 | Wike et al. | ................. | 235/383 |
| 2003/0216969 A1 * | 11/2003 | Bauer et al. | .................. | 705/22 |
| 2004/0065732 A1 * | 4/2004 | Bernds et al. | .............. | 235/383 |
| 2004/0102870 A1 * | 5/2004 | Andersen et al. | ........... | 700/215 |
| 2005/0246248 A1 * | 11/2005 | Vesuna | ........................ | 705/28 |

* cited by examiner

Primary Examiner—Jared J. Fureman
(74) Attorney, Agent, or Firm—Paul W. Martin

(57) ABSTRACT

A mobile inventory management system which reduces cost and inventory time. The mobile inventory system includes a reader in a cart for reading radio frequency identification labels on items, and wireless communication circuitry in the cart for transmitting item identification information obtained by the reader to a database.

10 Claims, 3 Drawing Sheets

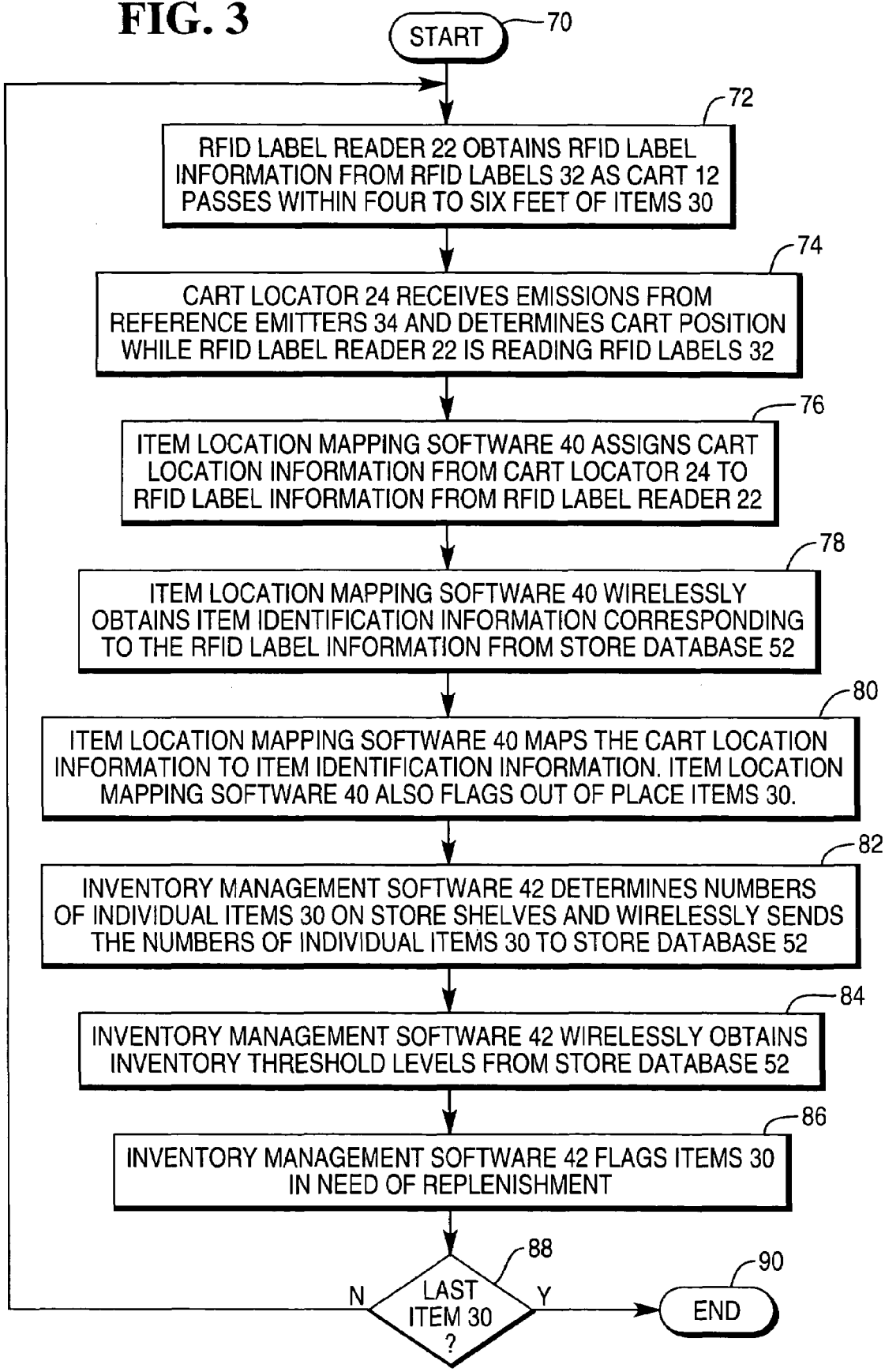

MOBILE INVENTORY MANAGEMENT SYSTEM

BACKGROUND OF THE INVENTION

The present invention relates to inventory management methods and more specifically to a mobile inventory management system.

One of the primary value propositions for tagging items with radio frequency identification (RFID) labels is the ability to monitor store inventory and automate the replenishment process. As the scenario is described, RFID-enabled store shelves will constantly query their contents and report the results to a store inventory system. When a certain product falls below a specific threshold (or is completely depleted), store personnel are automatically notified to replenish the item.

The current problem with this scenario is primarily the cost of the RFID system. Ignoring the cost issues associated with placing RFID tags on each item in the store, there is a substantial infrastructure cost to equip the store premises with an effective, storewide RFID system.

For example, most standard RFID readers are only effective at a range of one to two meters, and do not "read" accurately through metal shelving. Thus, a separate antenna would probably be required on each shelf of every four-foot metal shelf in the store. A large store might need hundreds or thousands of antennae to fully instrument all their shelves.

Especially now, when the economics of item-level RFID tagging have not been demonstrated, the huge cost of installing antennae, readers, and associated wiring will prevent many retailers from widely deploying RFID in their stores for quite some time.

Therefore, it would be desirable to provide a less expensive alternative including a mobile inventory management system.

SUMMARY OF THE INVENTION

In accordance with the teachings of the present invention, a mobile inventory management system is provided.

The mobile inventory system includes a reader in a cart for reading radio frequency identification labels on items, and wireless communication circuitry in the cart for transmitting item identification information obtained by the reader to a database.

It is accordingly an object of the present invention to provide a mobile inventory management system.

It is another object of the present invention to provide a less expensive alternative to a fully wired radio frequency identification (RFID) infrastructure.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating operation of the inventory management system.

DETAILED DESCRIPTION OF THE PREFERRED EMBODIMENT

Figure 1:
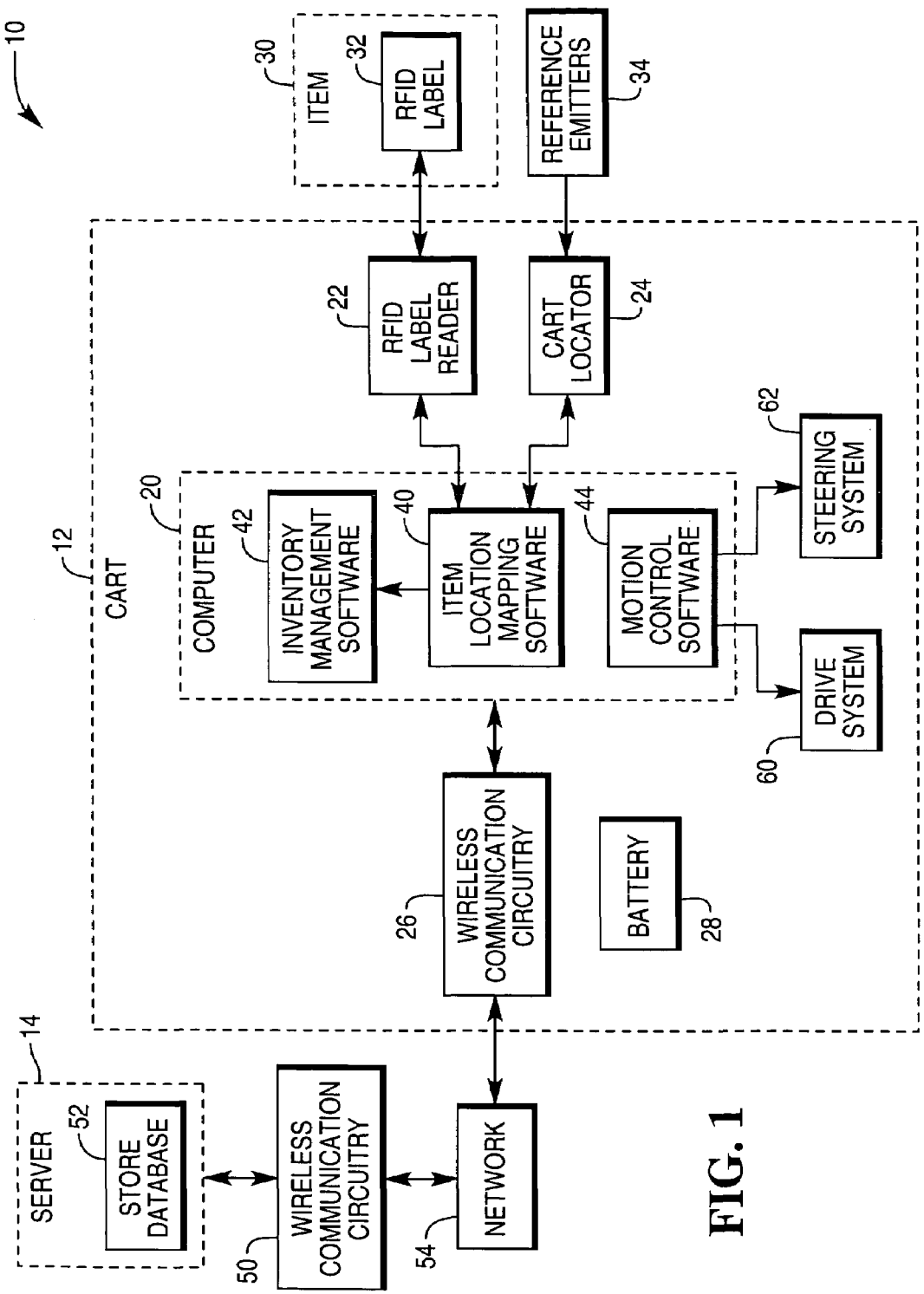
FIG. 1 is a block diagram of a first embodiment of an inventory management system.

Referring now to FIG. 1, a first embodiment of system 10 includes cart 12 and server 14.

Cart 12 is mobile and preferably has wheels for facilitating movement up and down aisles in a store. Cart 12 includes computer 20, radio frequency identification (RFID) label reader 22, cart locator 24, wireless communication circuitry 26, and battery 28.

Computer 12 executes item location mapping software 40 and inventory management software 42.

Item location mapping software 40 obtains RFID label information from RFID label 32, obtains cart location information from cart locator 24, obtains item identification information associated with RFID label information from store database 52, and maps RFID label information and corresponding item identification information to cart location information to create a map for locating items 30 throughout the store.

Item location mapping software 40 may also determine a preferred location of item 30 from store database 52 and compare it to mapped item locations. Item location mapping software 40 flags any items 30 that it determines to be out of place. Once alerted, an operator may return the out of place items 30 to their correct locations.

Inventory management software 42 determines numbers of individual items 30 on store shelves, obtains inventory threshold levels from store database 52, and flags items 30 in need of replenishment. Store personnel may then either re-stock those items or place orders for the depleted items 30. Inventory management software 42 sends the numbers of individual items 30 to store database 52.

Store database 52 contains plan-o-gram information and inventory threshold levels for ordering additional items 30. In addition, store database 52 includes item identification information, RFID label information, and price information. Store database 52 may include additional information about items 30, such as weight information.

Computer 12 optionally executes motion control software 44 during an optional mode of operation, in which drive system 60 and steering system 62 propel cart 12 on a pre-preprogrammed path through the store under the control of motion control software 44.

If item location information is not important, then cart 12 may be rolled around the store (or robotically directed by motion control software 44) and a total count of items 30 recorded.

RFID label reader 22 reads RFID labels 32 on items 30 to obtain RFID label information.

Cart locator 24 determines locations of cart 12 throughout the store. Cart locator 24 takes a fix using emissions from reference emitters 34. Cart locator 24 may rely on known triangulation techniques for determining position.

Reference emitters 34 may include radio frequency (RF) or infrared emitters. Reference emitters 34 are spread apart throughout the store so that cart locator 24 may accurately determine the position of cart 12.

Computer 20 communicates with server 14 through wireless network 54. Computer 20 couples to wireless communication circuitry 26, which may include a wireless network adapter or radio-type network communicator. Server 14 couples to wireless communication circuitry 50, which may also include a wireless network adapter.

Battery 28 provides power to computer 20, RFID label reader 22, cart locator 24, and wireless communication circuitry 26.

Optional drive system 60 propels cart 12 through the store. Drive system 60 includes an electric motor.

Optional steering system 62 controls the direction of movement of cart 12.

Drive system 60 and steering system 62 are under the control of motion control software 44.

Figure 2:
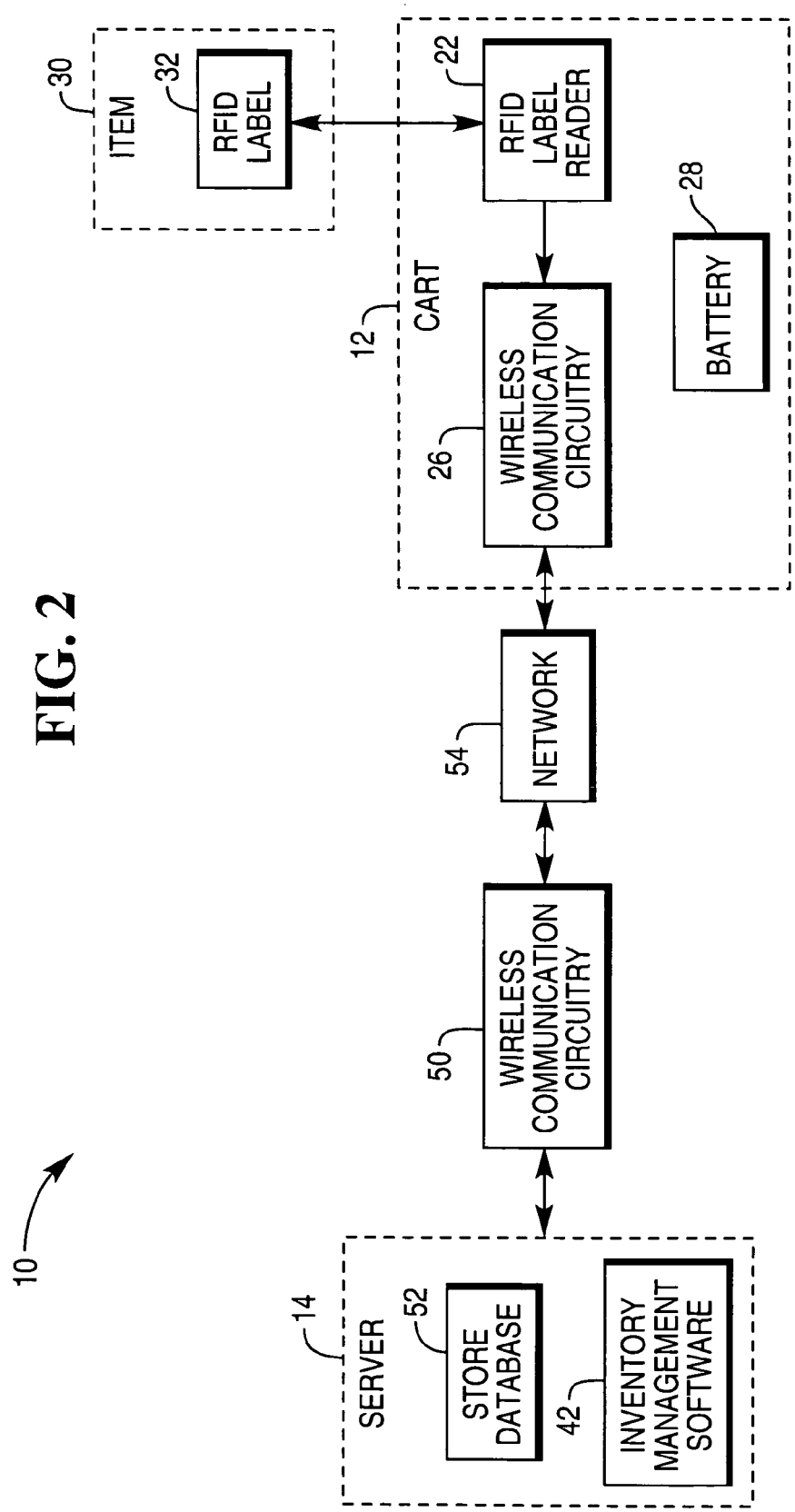
FIG. 2 is a block diagram of a second embodiment of the inventory management system.

Turning now to FIG. 2, a second embodiment of system 10 includes RFID label reader 22, wireless communication circuitry 26, and battery 28.

Wireless communication circuitry 26 transmits data recorded by RFID label reader 22 via through the in-store network 54 to server 14 or some other remote computer.

Server 14 executes inventory management software 42.

Advantageously, this embodiment substantially reduces the size, power requirements, and complexity of cart 12.

With reference to FIG. 3, operation of cart 12 is illustrated in more detail beginning with START 70.

In step 72, RFID label reader 22 obtains RFID label information from RFID labels 32 as cart 12 passes within four to six feet of items 30.

In step 74, cart locator 24 receives emissions from reference emitters 34 and determines cart position while RFID label reader 22 is reading RFID labels 32.

In step 76, item location mapping software 40 assigns cart location information from cart locator 24 to RFID label information from RFID label reader 22.

In step 78, item location mapping software 40 wirelessly obtains item identification information corresponding to the RFID label information from store database 52.

In step 80, item location mapping software 40 maps the cart location information to item identification information. Item location mapping software 40 also flags out of place items 30.

In step 82, inventory management software 42 determines numbers of individual items 30 on store shelves and wirelessly sends the numbers of individual items 30 to store database 52.

In step 84, inventory management software 42 wirelessly obtains inventory threshold levels from store database 52.

In step 86, inventory management software 42 flags items 30 in need of replenishment.

In step 88, operation returns to step 72 until cart 12 has captured inventory information on all items 30 in the store, and then operation ends at step 90.

Advantageously, retailers may begin to realize the benefits of RFID technology without investing huge amounts of money to equip their stores with storewide RFID systems. This solution allows retailers to begin to obtain a positive return on investment from RFID technology much sooner than with the conventional smart shelf concept.

Although the invention has been described with particular reference to certain preferred embodiments thereof, variations and modifications of the present invention can be effected within the spirit and scope of the following claims.

What is claimed is:

1. A mobile inventory system comprising:
   a cart locator for determining cart location information of a cart;
   a reader mounted to the cart for reading radio frequency identification labels on items;
   wireless communication circuitry mounted to the cart; and
   a computer mounted to the cart for determining locations of the items from the cart location information, for wirelessly sending radio frequency identification label information to a store database, for obtaining item identification information corresponding to the radio frequency identification label information from the store database, for mapping the cart location information to the item identification information and for sending a mapping of the item identification information and the cart location information to the store database.

2. The system of claim 1, wherein the computer is also for managing inventory levels of the items.

3. The system of claim 1, wherein the cart locator takes a fix by applying triangulation techniques to emissions from reference emitters.

4. The system of claim 1, further comprising:
   the cart;
   a motion control system for driving and steering the cart; and
   wherein the computer is also for controlling the motion control system and for causing the cart to travel in a prescribed path.

5. The system of claim 1, wherein the wireless communication circuitry comprises a wireless network radio.

6. A mobile inventory system comprising:
   a cart;
   a cart locator for determining cart location information;
   a motion control system for driving and steering the cart;
   a reader in the cart for determining radio frequency identification label information from radio frequency identification labels on items in a store;
   wireless communication circuitry in the cart; and
   a computer in the cart for controlling the motion control system and for causing the cart to travel in a prescribed path throughout the store, for determining locations of the items from the cart location information, for wirelessly sending the radio frequency identification label information to a store database, for obtaining item identification information corresponding to the radio frequency identification label information from the store database, for mapping the cart location information to the item identification information and for sending a mapping of the item identification information and the cart location information to the store database.

7. A method comprising the steps of:
   reading radio frequency identification label information from radio frequency identification labels on items in a store as a cart containing a radio frequency identification label reader passes within a predetermined distance of the items;
   determining locations of the cart while reading the radio frequency identification labels;
   assigning cart location information to radio frequency identification label information;
   wirelessly obtaining item identification information corresponding to the radio frequency identification label information from a store database; and
   mapping the cart location information to the item identification information.

8. The method of claim 7, further comprising the step of:
   flagging out of place items.

9. The method of claim 7, further comprising the steps of:
   determining numbers of the items; and
   wirelessly sending the numbers to the store database.

10. The method of claim 9, further comprising the steps of:
    wirelessly obtaining inventory threshold levels from the store database; and
    flagging items in need of replenishment.

\* \* \* \* \*